United States Patent [19]

Menardi et al.

[11] Patent Number: 4,919,799

[45] Date of Patent: Apr. 24, 1990

[54] OPTICAL CODE READER SORTING APPARATUS CONDITIONED BY TRIGGER INDICIA

[75] Inventors: Elaine A. Menardi, Westminster; Terrence E. Rhodes, Broomfield; David R. Siemer, Golden, all of Colo.

[73] Assignee: Adolph Coors Company, Golden, Colo.

[21] Appl. No.: 285,518

[22] Filed: Dec. 14, 1988

[51] Int. Cl.[5] ........................ B07C 5/02; G06K 7/016

[52] U.S. Cl. .................................... 209/538; 209/551; 209/583; 209/644; 250/566; 356/428

[58] Field of Search ............... 209/538, 539, 540, 545, 209/551, 563-566, 569, 583, 644; 250/566, 224; 356/23, 426, 428; 235/471; 194/205, 208, 209, 212, 213

[56] References Cited

U.S. PATENT DOCUMENTS 4,044,227 8/1977 Holm et al. .................... 209/583 X
4,074,130 2/1978 Messman et al. ............... 356/428 X
4,248,334 2/1981 Hanley et al. ....................... 194/209
4,248,389 2/1981 Thompson et al. ............ 209/538 X
4,285,426 8/1981 Cahill ................................ 194/209
4,305,658 12/1981 Yoshida ............................... 356/23
4,437,985 3/1984 Hinds et al. ......................... 209/538
4,454,028 6/1984 Vetter et al. .................... 209/551 X
4,497,409 2/1985 Chong ................................ 209/538
4,642,470 2/1987 Planke ........................... 194/205 X
4,693,178 9/1987 Hudec .
4,707,251 11/1987 Jenkins et al. .................. 209/583 X
4,717,026 1/1988 Fischer et al. ...................... 209/539

FOREIGN PATENT DOCUMENTS 2119431 11/1971 Fed. Rep. of Germany ...... 209/583

*Primary Examiner*—Margaret A. Focarino
*Assistant Examiner*—Edward M. Wacyra
*Attorney, Agent, or Firm*—Klaas & Law

[57] ABSTRACT

A sorting apparatus for differentiating between generally identically shaped objects based upon code indicia provided on a predetermined, relatively small surface area portion on the sidewall of each object, including: a transfer assembly for moving the objects in single file relationship along a transfer path; a spinning assembly for engaging an object in the transfer path and for spinning the engaged object about its longitudinal axis during a relatively short duration spinning period without removing the object from the transfer path; a trigger assembly for sensing the passage of a trigger indicia, located at a predetermined circumferential position on the surface of the object relative to the code indicia; a code indicia reading assembly for reading the code indicia printed on the object; a reading actuation assembly responsive to the trigger signal for actuating the code indicia reading assembly at a time when the code indicia on the object is positioned in indexed, readable relationship with the reading assembly; and a comparator assembly for comparing the indicia reading signal to predetermined comparison criteria and for generating a criteria match signal indicative of a match between the indicia reading signal and the predetermined criteria.

32 Claims, 4 Drawing Sheets

FIG. 2
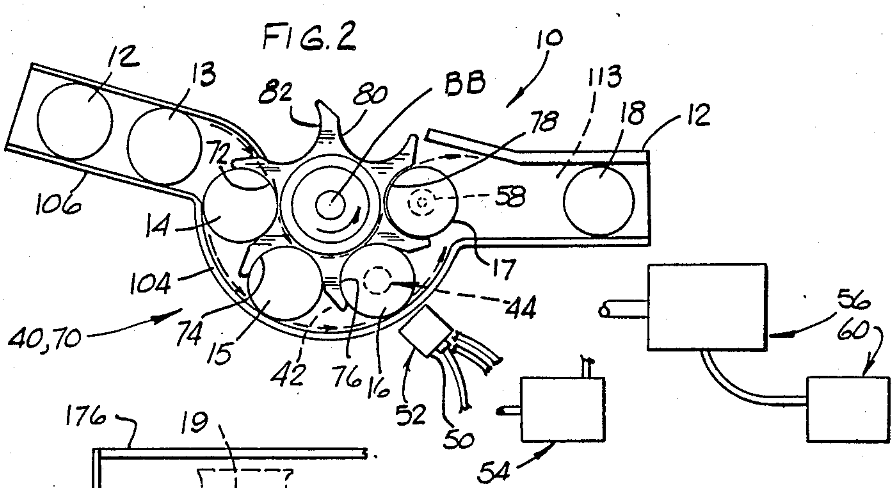
FIG. 1
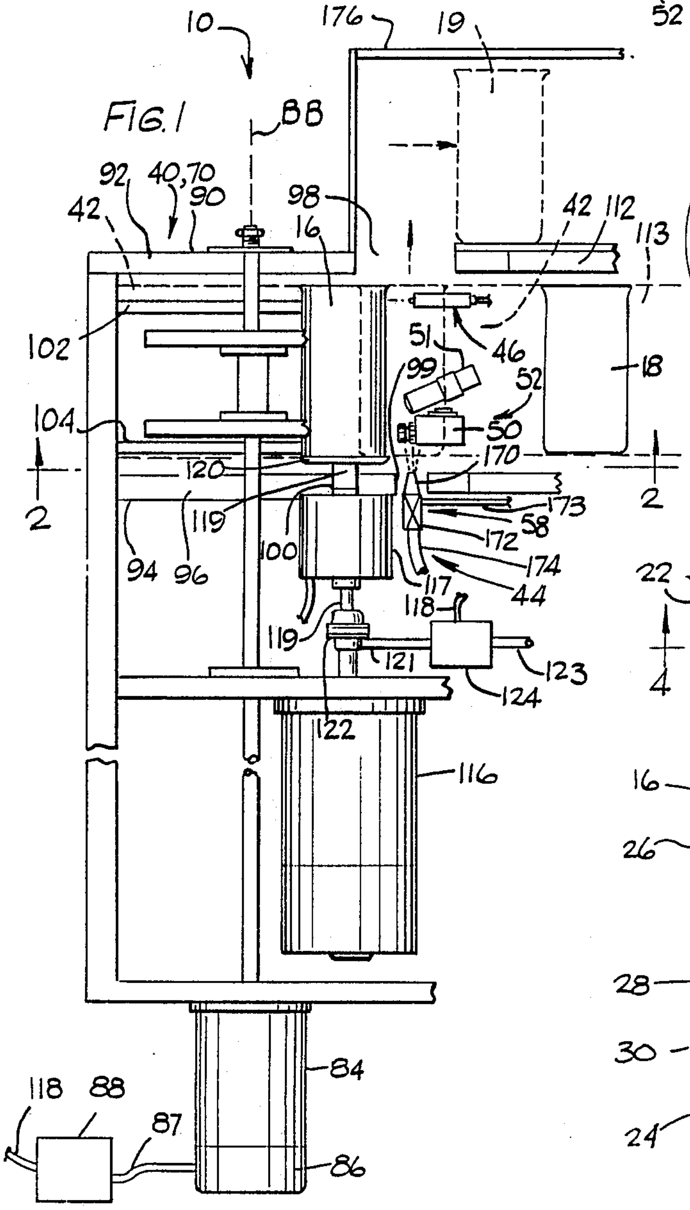
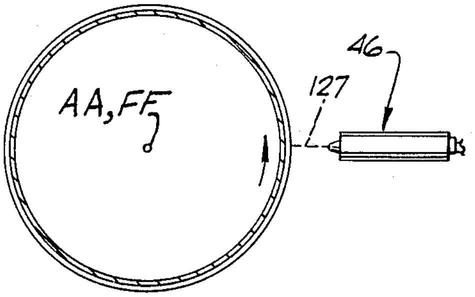
FIG. 4
FIG. 3
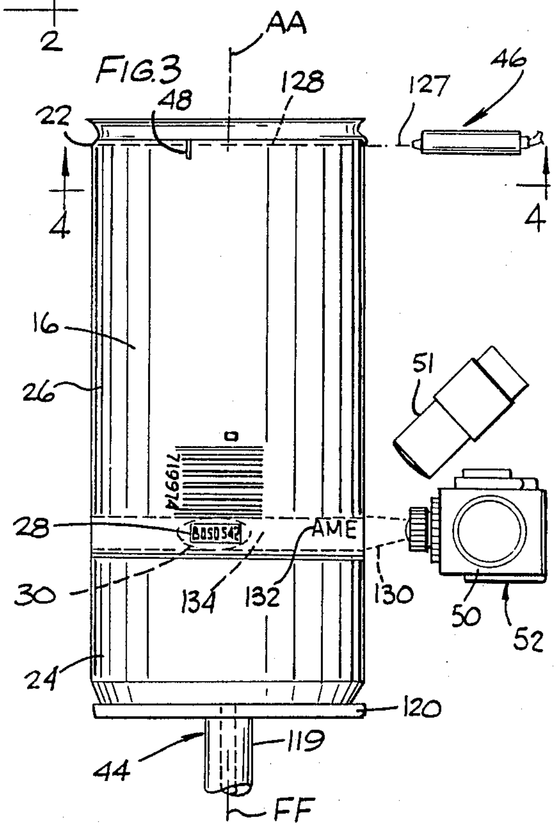

OPTICAL CODE READER SORTING APPARATUS CONDITIONED BY TRIGGER INDICIA

BACKGROUND OF THE INVENTION

The present invention relates generally to sorting apparatus and, more particularly, to a sorting apparatus for sorting generally identically-shaped objects based upon code indicia provided on a sidewall portion of each object.

Most modern beverage cans are so-called two-part seamless cans. Such cans include a unitary can body having a generally cylindrical sidewall and an integrally formed bottom wall. The can body is open at the upper end and a circular can end is sealingly attached over the open end to provide a complete two-part can. Prior to attachment of the can end, the can body undergoes a number of processing steps including the printing thereof with display graphics and identifying indicia. This printing process is known in the art as "decorating" and the apparatus used to perform this process is referred to as a "decorator". The identifying indicia printed on a can body by a decorator may include a bar code and conventional alphanumeric characters. Typically, the bar code extends longitudinally of the can body and contains information relating to the beverage brand and type. The alphanumeric identifying indicia may extend circumferentially of the can body and may identify the date and shift in which the can body was processed and the production line and decorator which processed the can body. Occasionally, due to improper ink pigmentation, decorating registration problems, or the like, a decorator will produce poor-quality graphics and the decorating malfunction will not be detected until after hundreds or thousands of the defectively-decorated can bodies have been commingled with can bodies decorated by other properly functioning decorators. Other product defects, such as internal denting, internal coating, bodymaker defects, etc., may be produced in the production lines associated with a particular decorator.

Prior to the present invention, the only way of separating defectively-decorated or otherwise defective can bodies produced by a particular malfunctioning production line from the nondefective can bodies produced by other properly functioning production lines was to have quality control personnel hand-sort the can bodies after visually examining the alphanumeric identifying indicia on each can body. Due to the labor-intensive nature of this work, such sorting operations are quite expensive and time consuming. In some situations, it has proven to be more cost-effective after a decorating malfunction to simply discard all of the commingled can bodies produced during a particular period than to sort the good can bodies from the bad. Thus, a need exists for providing a sorting apparatus which is capable of quickly, accurately, and inexpensively sorting large numbers of can bodies to remove defectively-decorated can bodies from properly-decorated can bodies.

A problem similar to that discussed above is experienced in container-return operations. Many states charge deposits on beverage cans which are refunded automatically when cans are deposited in automated can return banks. However, a problem that exists with such a system is that cans from states not having a deposit return program may be improperly deposited in the can banks. Thus, a need exists for an apparatus for use with an automated can bank which is capable of reading the indicia printed on can bodies to determine whether payment of a deposit should be made.

Another similar problem relates to the allocation of charges to be paid by beverage producers to retailers for returned beverage containers. Generally, each beverage producer who sells beverages in a state having deposit requirements makes arrangements with retail outlets, etc. to collected the producer's containers and to pay consumers a return deposit fee for returned containers. The beverage producer reimburses the retailer for all return deposits paid to customers by the retailer for the beverage manufacturer's cans. However, since most retailers collect containers for many different beverage producers, the way by which a retailer keeps track of how much money is due from each beverage producer has generally been for the retailer to periodically hand-sort and count the collected containers. Thus, a need exists for an apparatus which is capable of automatically, accurately, and quickly reading identifying indicia printed on each can body in a batch of commingled cans for identifying the source of origin of each can and for keeping track of the number of cans from each source of origin which have been returned.

Apparatus for reading a bar code printed on beverage cans is disclosed in Thompson et al., U.S. Pat. No. 4,248,389; Jenkins et al., U.S. Pat. No. 4,707,251; and Fischer et al., U.S. Pat. No. 4,717,026, all of which are hereby specifically incorporated by reference for all that is disclosed therein. The Thompson et al. patent discloses a apparatus which moves cans one at a time onto a roller means which rotates each can. An optical scanner is positioned adjacent to the roller means and reads the code on the rotating can as it is swept by the scanner. Jenkins et al. and Fischer et al. each describe an apparatus of the type in which cans are moved lengthwise in single file past a UPC or bar code type scanner, i.e. the type of scanner used at most grocery store checkout stands. The apparatus moves the cans relatively slowly and causes the cans to rotate as they move such that the entire surface of each passing can is exposed to the bar code scanner beam. Thus, the bar code on each can is at some point exposed to the scanner which senses and reads the bar code.

Container reading devices such as Thompson et al., Jenkins et al., and Fischer et al., although useful in sorting functions based on bar code data, are not adapted to read conventional alphanumeric characters printed on a can body. Due to the unique configuration of bar code indicia, bar code scanners are able to readily distinguish bar code indicia from other indicia which may pass through the scanning beam. Thus, even though other indicia such as product graphics, printed words, etc., are provided on most containers and pass through the bar code scanner beam, the bar code scanner only reads the bar code. However, when code indicia such as ordinary alphanumeric characters are to be read, a problem exists with differentiating the alphanumeric characters which are to be read, from other indicia, printed on the can. Stating this problem in somewhat different words, bar code indicia are "self-identifying" due to their unique configuration. A bar code scanner, based upon the line width, spacing intervals, etc., of the various portions of a bar code mark, "knows" whether or not it is scanning a bar code indicia. Most other identifying indicia which are printed on a can body, such as conventional alphanumeric characters used to identify a can decorating date, etc., are not self-identifying. If code indicia are not self-identifying, then scanning the entire surface or a large surface portion of an object for the purpose of reading the code indicia will not be useful because the scanning device will not be able to distinguish the code indicia from the many other indicia which are scanned.

Thus, a need exists for an apparatus which is capable of distinguishing and/or sorting objects based upon code indicia printed thereon which may or may not be self-identifying indicia. More specifically, a need exists for an apparatus which is capable of high-speed, accurate sorting of can bodies based upon alphanumeric characters or other non-self-identifying characters printed on the can bodies which are indicative of the time the can body was decorated and which are indicative of the particular decorator which decorated the can body.

SUMMARY OF THE INVENTION

The present invention is directed to a sorting apparatus which may be used to separate defective can bodies from commingled, nondefective can bodies. The sorting apparatus of the present invention may also be used to identify the source of origin of each can body which is received by a can bank for determining whether payment for the returned can should be made. The sorting apparatus of the present invention may also be used to process a batch of cans containing cans from a plurality of different sources of origin so as to determine the number of cans present in the batch which were produced at certain, predetermined sources of origin. The sorting apparatus is adapted to distinguish between can bodies based upon code indicia provided thereon whether or not the code indicia are "self-identifying," e.g. bar code type, indicia and whether or not other indicia are present on the can body.

Thus, the present invention may comprise a sorting apparatus for sorting generally identically shaped objects having a first end, a second end, a central longitudinal axis and a longitudinally extending sidewall based upon code indicia provided on a predetermined, relatively small surface area portion on the sidewall of each object, comprising: (a) transfer mean for moving said objects in single file relationship along a transfer path extending substantially perpendicular to the longitudinal axes of the objects being moved therealong; (b) spinning means for engaging an object in said transfer path and for spinning said engaged object about its longitudinal axis during a relatively short duration spinning period without removing said object from said transfer path; (c) trigger means for sensing the passage of a trigger indicia, located at a predetermined circumferential position on the surface of said object relative to said code indicia, during the spinning of said object by said spinning means and for generating a trigger signal responsive thereto; (d) code indicia reading means for reading said code indicia printed on said object and for generating an indicia reading signal indicative of indicia read thereby; (e) reading actuation means responsive to said trigger signal for actuating said code indicia reading means for a short duration period during the spinning of said object at a time when said code indicia on said object is positioned in readable relationship with said reading means; (f) comparator means for receiving the indicia reading signal from said indicia reading means and for comparing said signal to predetermined comparison criteria and for generating a criteria match signal indicative of a match between said indicia reading signal and said predetermined criteria; (g) object segregating means responsive to said criteria match signal for segregating objects having code indicia conforming to said predetermined criteria from objects having code indicia not conforming to said predetermined criteria; and (h) recording means responsive to said criteria match signal for recording the number of objects passing through said transfer means which match said predetermined criteria and/or which do not match said predetermined criteria.

The invention may also comprise a method of sorting generally identically shaped objects based upon code indicia provided on a predetermined, relatively small surface area portion of the sidewall of each object comprising: (a) moving the objects to be sorted in a single file relationship along a continuous object transfer path extending transversely of the longitudinal axes of the objects; (b) temporarily halting the movement of each object moving along the transfer path at a predetermined spinning station along the path; (c) spinning each object which is stopped at the spinning station about its longitudinal axis without removing the object from the transfer path; (d) during the spinning of each object, monitoring a narrow circumferential band at a predetermined axial location on the surface of the object with a stationary sensor for detecting the passage of an axially extending trigger indicia provided on the surface of the object in predetermined circumferential relationship with the code indicia provided on the object and generating a trigger signal indicative thereof; (e) in response to said trigger signal, actuating a stationary, imaging apparatus at a time, during spinning of the object, when the code indicia on the object is located in the field of view of the imaging apparatus so as to generate an image of the code indicia; and (f) comparing the image of the code indicia generated by the imaging apparatus to predetermined criteria; (g) physically segregating the objects having code indicia conforming to said predetermined criteria from objects having code indicia not conforming to said predetermined criteria; (h) recording the passage of each object having code indicia matching said predetermined criteria. The predetermined comparison criteria may comprise a plurality of different sets of criteria.

The invention may also comprise an apparatus for sorting generally identically shaped elongate objects of the type having a first end, a second end, a central longitudinal axis extending between said first end and said second end, and a circumferentially and longitudinally extending sidewall, the sorting being based upon information contained in coded indicia provided in the same, relatively small area region on the sidewall surface of each object, said small area region lying within a circumferential band containing other, circumferentially obstructing indicia, each object also comprising a trigger indicia positioned in a predetermined, circumferentially fixed relationship with the code indicia, said trigger indicia being provided in a 360° circumferential band which is free of indicia other than said trigger indicia, said sorting apparatus comprising: (a) starwheel means for moving said objects along an arcuate transfer path, said starwheel means having a first axial end, a second axial end, and a central axis of rotation; and having a plurality of equally circumferentially spaced object receiving and holding pockets positioned at the periphery thereof, each of said pockets being adapted to hold one of said objects therein with said central longitudinal axis of said object positioned parallel to said central longitudinal axis of said starwheel and with said first end of said object positioned proximate said first axial end of said starwheel means and with said second end of said object positioned proximate said second axial end of said starwheel means; (b) guiding means operatively associated with said starwheel means for retaining said objects received in said pockets in radially, axially and circumferentially stationary relationship with respect to said starwheel means while said objects are transversing said arcuate transfer path; (c) a starwheel indexing drive means for rotating said starwheel means about said central axis of rotation in a series of equal incremental movements, the number of said equal incremental movements required to provide a complete revolution of said starwheel means being equal to an integer number multiple of the number of pockets provided on said starwheel means whereby each pocket is positioned in the same relatively rotated position as the immediately preceding pocket after a predetermined number of incremental movements; (d) starwheel position indicating mean for sensing predetermined, relatively rotated positions of said starwheel means corresponding to the axial alignment of each pocket on said starwheel with a predetermined spinning station positioned at a fixed location along said arcuate transfer path and for providing an indexing signal in response thereto; (e) spinning means located at said spinning station and engageable and disengageable from an object in a pocket positioned in indexing relationship with said spinning station for spinning said object about its central longitudinal axis without removing the object from said pocket; (f) trigger indicia sensor means positioned at said spinning station at a fixed location radially adjacent to said transfer path, said trigger indicia sensor means having a scanning beam adapted to be directed upon the surface of an object being spun by said spinning means in the region of said circumferential band containing said trigger indicia for sensing the passage of said trigger indicia and generating a trigger signal in response thereto; (g) asynchronous strobe means positioned proximate said camera means for illuminating said object during spinning thereof at a time when the code indicia thereon is positioned in camera viewable relationship with a camera means; (h) camera means positioned at said spinning station at a location radially adjacent to an object in a pocket which is indexed to said spinning station and at an axial location corresponding to the axial location of said code indicia on the object for generating an electronic image of the code indicia; (i) object rejection means for removing an object from the normal flow of objects along said arcuate transfer path; and (j) data processing means for receiving said indexing signal and for generating a spinning means control signal in response thereto for actuating said spinning means to engage, spin, and disengage an object positioned in an oppositely aligned pocket in response thereto; and for generating a trigger sensor control signal in response to said indexing signal for actuating said trigger indicia sensor means to sense the passage of trigger indicia passing through said trigger indicia sensor means scanning beam; and for receiving said trigger signal and for generating a strobe control signal in response thereto for actuating said asynchronous strobe means at a time when said code indicia on an object being spun is positioned in camera-viewable relationship with said camera means; and for generating a camera control signal in response to said trigger signal for actuating said camera for producing said electronic image of said code indicia during illumination thereof by said asynchronous strobe means; and for processing said code indicia image for comparing said image to predetermined criteria and for generating an object reject control signal based upon said comparison for actuating said object reject means for removing objects conforming to said predetermined criteria.

BRIEF DESCRIPTION OF THE DRAWINGS

An illustrative and presently preferred embodiment of the invention is shown in the accompanying drawings in which:

FIG. 1 is a top, partly broken-away, plan view of a can body sorting apparatus with several cans removed for clarity.

FIG. 2 is a cross sectional side elevation view of the can body sorting apparatus of FIG. 1.

FIG. 3 is a detail view of the can body sorting apparatus of FIG. 1 showing the relative position of various functional components with respect to a can body which is engaged by a spinning device.

FIG. 4 is a cross sectional elevation view of the can body and a trigger indicia sensor illustrated in FIG. 3.

DETAILED DESCRIPTION OF THE INVENTION

In General

Figure 5:
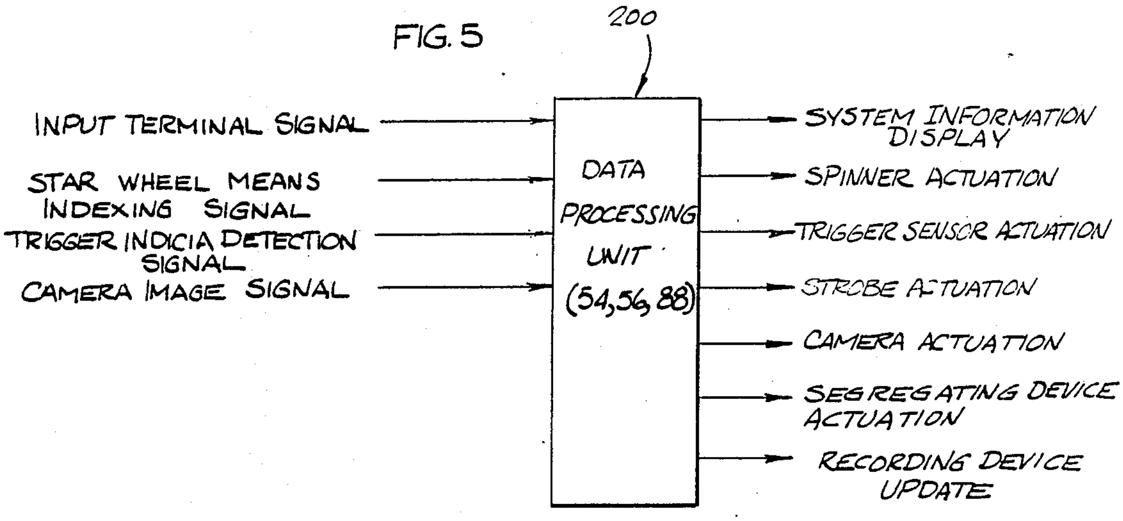
FIG. 5 is a block diagram illustrating primary inputs and outputs of a sorting apparatus data processing system.

FIGS. 1 and 2 show a sorting apparatus 10 for sorting generally identically shaped objects 12–19 such as beverage can bodies having a first end 22, a second end 24, a central longitudinal axis AA and a longitudinally extending sidewall 26, FIG. 3, based upon code indicia 28 provided on a predetermined, relatively small surface area portion 30 on the sidewall 26 of each object. The small area portion 30 is located at the same circumferential and axial position on each object.

The sorting apparatus includes a transfer means 40 for moving the objects in single file relationship along an object transfer path 42, shown in dashed lines in FIGS. 1 and 2, extending substantially perpendicular to the longitudinal axes AA of the objects 14–17 being moved therealong.

A spinning means 44, FIGS. 1 and 3, is provided for engaging an object 16 in the transfer path and for spinning the engaged object 16 about its longitudinal axis AA during a relatively short duration spinning period without removing the object 16 from the transfer path 42.

The apparatus also includes trigger means 46 for sensing the passage of a trigger indicia 48. The trigger indicia 48 is located at a predetermined axial and circumferential position on the surface of each object relative to the position of the code indicia 28 and is sensed by the trigger means during the spinning of the object by the spinning means. The trigger means generates a trigger signal responsive to sensing the trigger indicia.

A code indicia reading means 52 is provided for reading the code indicia 28 printed on each object and for generating an indicia reading signal indicative of the indicia read thereby.

A reading actuation means 54 is provided which is responsive to the trigger signal for actuating the code indicia reading means 52 for a short duration period during the spinning of the object 16 at a time when the code indicia 28 on the object is positioned in readable relationship with the reading means 52.

The apparatus 10 may include a comparator means 56 for receiving the indicia reading signal from the indicia reading means 52 and for comparing the signal to predetermined comparison criteria and for generating a criteria match signal indicative of a match between the indicia reading signal and the predetermined criteria.

The apparatus 10 may also include object segregating means 58 responsive to the criteria match signal for segregating objects, e.g. 19, having code indicia conforming to said predetermined criteria from objects, e.g. 18, having code indicia not conforming to said predetermined criteria.

The apparatus 10 may also include recording means 60 responsive to the criteria match signal for recording the number of objects passing through the transfer means which match the predetermined criteria.

Having thus described the invention in general, various features of the invention will now be described in further detail.

Transfer Means

As best illustrated in FIG. 1, the transfer means may comprise a starwheel means 70 for receiving and transferring objects 14–18 along an arcuately-shaped transfer path 42. The starwheel means comprises a central axis of rotation BB extending parallel to the central longitudinal axes AA of objects 14–17 received therein. The starwheel comprises pocket means 72, 74, 76, 78, 80, 82 arranged symmetrically about the periphery thereof for receiving and holding the objects 14, 15, etc., therein. A starwheel drive means 84 is provided for rotating the starwheel means 70 about its central axis of rotation BB. A starwheel indexing means 86 is provided for controlling the rotation of the starwheel means for temporarily, sequentially, placing each pocket means, e.g. 76 thereon, in axially opposite, indexed relationship with the spinning means 44 for enabling axial engagement and spinning of an object 16 in the indexed pocket means 76 by the spinning means 44. The starwheel means has a first axial end 90 defined by a radially extending plate 92 which is adapted to be positioned axially next adjacent to the first end 22 of objects received in the pocket means for limiting axial displacement of the objects in a first axial direction during movement thereof along the transfer path 42. The starwheel means comprises a second axial end 94 defined by a second radially extending plate 96 which is adapted to be positioned axially adjacent to the second end 24 of objects received in the pocket means for limiting axial movement thereof in a second axial direction as the objects are moved along the transfer path. The first radially extending plate 92 has a hole 98 therein having a diameter slightly larger, e.g. 10% larger, than the diameter of an associated object 12, 13, etc., for permitting axial discharge of an object from the transfer path 42 by the object segregating means 58 as described in further detail hereinafter. The radially extending plate 96 at the starwheel second axial end comprises a hole 99 therein for receiving a blower nozzle 170 therethrough and also comprises a hole 100 therein which is adapted to receive a portion of the spinning means 44 therethrough, as described in further detail hereinafter. The starwheel means may comprise first and second circumferentially extending guide members 102, 104 which extend about the lower periphery of the starwheel means radially adjacent to objects 14, 15, etc., received in the pocket means for preventing axial movement of the objects as they move along the transfer path 42.

As best illustrated by FIG. 2, an infeed device 106 is provided for feeding objects 12, 13, etc., into the starwheel means 70 in single file relationship and with the first end 22 of each object positioned proximate the first axial end 90 of the starwheel means, and with the second end 24 of each object positioned proximate the second axial end 94 of the starwheel means. However, the objects 12, 13, etc., are randomly angularly oriented relative to the central longitudinal axis AA thereof as they enter the starwheel means 72, i.e. indicia 28 printed on an object sidewall might be positioned at any relatively rotated position with respect to a fixed frame of reference at the time that an object is received in a starwheel pocket.

The transfer path 42 provided by the starwheel means may be a generally semicircular path having an axial dimension, defined by plates 92 and 96, slightly larger, e.g. 5% larger, than the axial length of objects which are to be moved therealong. The starwheel means may be provided with a conventional discharge device 112 extending generally perpendicular to the axis of rotation of the starwheel means for receiving objects from the starwheel mean and continuing transfer thereof along a normal product flow path 113 subsequent to passage thereof through the starwheel means. This discharge device 112 may be a gravity feed chute, conveyor, or any number of conventional product transfer and/or accumulator devices well-known in the art.

The starwheel indexing means 86 may be an electronic control unit adapted to control the starwheel drive means to rotate the starwheel means about its central axis of rotation in a series of equal incremental movements. The number of these equal incremental movements which are required to provide a complete revolution of the starwheel means is equal to an integer number multiple of the number of pockets provided on the starwheel means. For example, in a starwheel means having six pocket means, the number of equal incremental movements required to produce one revolution of the starwheel means might be designed to be six, twelve, eighteen, twenty-four, etc. Thus, each pocket means, e.g. 76, is positioned in the same relatively rotated position as the immediately preceding pocket means, e.g. 78, after a predetermined number of incremental movements, e.g. after three incremental movements in one preferred embodiment. The indexing means generates an electrical signal indicative of a pocket means being positioned in indexed relationship with the spinning means 54. The signal may be transmitted through cable 87 to a control circuit 88 which actuates the spinner means 44 and trigger means 46 through cables 118, in response to the indexing signal as further described below. Circuit 88 may comprise a single conventional timing circuit which generates a first signal pulse to actuate spinner means 88 and trigger means 46 in response to the indexing signal and which generates a second signal pulse of a fixed period of time after the first pulse to deactivate the spinner means and trigger means. Alternatively, circuit 88 may comprise two or three different timing circuits for actuating components of the spinning means and trigger means at slightly different times.

Starwheels and starwheel drive units and starwheel indexing control units are well-known by those having skill in the art; see, e.g., U.S. Pat. No. 4,693,178 of Hudec for PRINTING MACHINE WITH MANDREL WHEEL SKIP-PRINT VERIFICATION AND RESPONSE which is hereby specifically incorporated by reference for all that it contains. The starwheel drive means may be of a type sold under the product designation model RM643, manufactured by Reliance Electric Company having a business address of 24703 Euclid Avenue, Cleveland, Ohio, 44117. The starwheel indexing means 86 may be of a type such as sold under the product designation DCS5000, manufactured by Reliance Electric Company having a business address of 24703 Euclid Avenue, Cleveland, Ohio, 44117. In one embodiment of the invention comprising a selectively variable speed drive means and a selectively variable speed indexing means, the starwheel means operates at a selected speed between 0 and 33 revolutions per minute and processes can bodies at a selected rate of between 0 and 200 cans per minute.

Spinning Means

Spinning means 44, in one preferred embodiment as best illustrated in FIG. 1, comprises a conventional electrical motor 116 which is coupled to an electronically controlled differential unit 117 which is actuated as by a master control switch immediately after system start-up to continuously transmit torque from motor 116 to a spinning head unit 120 during system operation. Thus spinning head unit 120 spins continuously at a predetermined rate during system operation. The differential unit 118 comprises a hollow shaft portion 119 which is in fluid communication with a spinning head unit 120, FIG. 3, at one end thereof. The hollow shaft 119 receives vacuum from a suction line 121 which is placed in fluid communication with hollow shaft 119 by a conventional rotary, pneumatic coupling unit 122. Vacuum line 121 is connected to a conventional vacuum source 123 by a solenoid control valve 124 which is actuated through cable 118 by the control circuitry 88 associated with the indexing drive unit. Each time a starwheel pocket means is incrementally moved into indexed relationship with the spinning means 44, the starwheel indexing means 86 generates a signal which is processed by control circuitry 88 and which is used to actuate solenoid control valve 124 to provide a vacuum through hollow shaft 119 which draws an object 16 onto the spinner head 120, with the axis AA of the object positioned in substantially coaxial relationship with the central axis of rotation FF of the spinning head 120, FIGS. 3 and 4. Object 16 remains in engaged relationship with the spinning head 120 so long as solenoid valve 124 remains open. In one preferred embodiment, the vacuum is supplied for a predetermined period of time which is sufficiently long for the spinning motor to provide at least one complete revolution to the object. The solenoid valve 124 is thereafter actuated by circuit 88 to close and thus to terminate the vacuum to head 120 which in turn terminates engagement between the object 16 and the spinning head 120. The period of engagement between the spinning head 120 and the object is, of course, less than the period of time during which a pocket remains indexed to the spinning means.

In a typical operation of the system at a system operating rate of 200 cans per minute, a pocket may remain indexed to the spinning means for approximately 350 milliseconds, and the object 16 may be engaged by the spinning head for approximately 150 milliseconds and may be rotated approximately 400° about its central longitudinal axis during this period of engagement.

In a preferred embodiment, the spinning head 120 is axially stationary and is able to pull an object into engagement therewith due to the fact that the object is positioned within an associated pocket means in very near relationship, e.g. within ⅛ inch of the head 120. In the illustrated embodiment in which the objects to be sorted are aluminum can bodies, the vacuum engagement between spinning head 120 and the can bottom end 24 is facilitated by a dome-shaped recess (not shown) at the bottom of each can. In another embodiment (not shown), the can body is initially urged against the spinning head by an air jet applied axially of the can body at the first end 22 thereof, in addition to the suction force applied at the spinning head. In yet another embodiment of the invention (not shown), the spinner means head 120 is adapted to be moved axially inwardly to engage and spin an object and is subsequently moved axially outwardly to permit subsequent movement of the starwheel means. Other axial engagement means such as peripheral finger engagement (not shown) or other rotational engagement means might also be used. The spinning means motor 116 may be of a type such as that sold under product designation RM641, manufactured by Reliance Electric Company of 24703 Euclid Avenue, Cleveland, Ohio, 44117. Differential units such as unit 117 are conventional and well-known to those having skill in the art, and differential unit 117 may be any of a number of commercially available types. The device 122 for coupling the vacuum line 121 to the hollow shaft 119 may be of a type such as sold under product designation Flex Coupling PFS-24, manufactured by Metal Bellows of 1075 Providence Hwy., Sharon, Mass., 02067.

Trigger means and Reading Actuation Means

Trigger means 46, in one preferred embodiment, is a fixed sensor located radially adjacent the objects passing along the transfer path. The trigger means is also located at a predetermined circumferential position with respect to the arcuate transfer path which is near the spinning means 44. In one preferred embodiment of the invention, the trigger means 46 is a laser reflective photoelectric sensor such as that manufactured under the product designation model LZ-153 by Keyence Corp. of America having a business address of 20610 Manhattan Place, Suite 132, Torrance, Calif., 90501. The laser sensor has a narrow laser beam 127, e.g. 0.002 inches in diameter, which is directed against the surface of an object, e.g. 16, which is indexed to the spinning means 44 and which defines a narrow-width scanning ring 128 about the circumference of the object as it is being spun. The sensor is adapted to distinguish a trigger indicia 48, FIG. 3, which is provided in the narrow-width scanning path 128 from the rest of the path 128. The trigger indicia 48 is the only indicia provided in path 128 and is positioned at a fixed circumferential location with respect to the code indicia 28. For example, the trigger indicia 48 may be positioned approximately 1° of rotation about axis AA in advance of the circumferential location of the first character in code indicia 28. The trigger indicia may be, for example, a dark mark on a light background, a light mark on a dark background, etc.. When the register indicia 48 passes through the scanning beam 127, the trigger means 46 provides a signal indicative of the passage of the indicia 48 to a reading actuation means 54 which may comprise conventional electronic control circuitry such as is commercially available under the product designation AS-M501A, manufactured by Itran Corp. having a business address of 670 North Commercial Street, Manchester, N.H., 03101.

The trigger means signal is available to the reading actuation means only within a predetermined period of time during each period in which a pocket is positioned in indexed relationship with the spinning means. It will be appreciated by those having skill in the art that this result may be obtained by switching the trigger means "on" during these predetermined periods of time and "off" between these predetermined periods. Alternately, the trigger means may be maintained "on" continuously, and the signal from the trigger means which is sent to the reading actuation means may be interrupted between these predetermined periods of time. As used herein, the phrase "trigger means actuation" will refer to an event which initiates the use of the trigger means signal by the reading actuation means, whether it be through providing energy to the trigger means to turn it "on" or by manipulation of the trigger means signal in a continuously operating trigger means, etc. Similarly, "trigger means deactuation" as used herein refers to any event which terminates the reception and use of the trigger means signal by the reading actuation means. The "actuation" and "deactuation" of the trigger means is described below in the "Control System" section.

Code Indicia Reading Means

The code indicia reading means 52, in a preferred embodiment, comprises a camera, 50, FIG. 3, of the type which generates an electronic image of any portion of an object located within its field of view 130 at the time that it is actuated. In the preferred embodiment, the camera may be of a conventional commercially available type such as that sold under the product designation KP-140 CCD Solid State Camera manufactured by Hitachi America, Ltd., having a United States business address of 50 Prospect Avenue, Tarrytown, N.Y., 10591. As illustrated in FIGS. 1, 2, and 3, the camera 50 is positioned radially adjacent to the transfer path 42 at approximately the same circumferential location therealong as the spinning means and at an axial position relative to objects moved along the path such that the viewing field 130 of the camera encompasses the small area portion 30 on the object surface which contains the code indicia 28 at a time when the area 30 is in indexed relationship with the camera, i.e. is in radial alignment with the camera. FIG. 3 illustrates an object 16 in a relatively rotated position about its central longitudinal axis AA such that indicia 28 thereon is positioned at approximately 90° from a radial alignment position with camera 50. The camera will not be actuated until area 30 is rotated into radial alignment with the camera by the spinning means.

In the embodiment illustrated, indicia 132 other than the code indicia 28 are provided within the same narrow-width circumferential band 134 as that occupied by the code indicia 28. However, the existence of other indicia in the same circumferential band as the code indicia does not create a misreading problem for the sorting apparatus because the indicia which causes the camera 50 to be actuated is not the code indicia 28 itself nor any indicia located in band 132. Rather, it is the trigger indicia 48 as discussed above.

As indicated at 51, the reading means 52, in addition to a camera 50, may comprise an illumination device such as a conventional asynchronous strobe light such as that sold under the product designation MVS 2020, by EG&G Electro-optics having a business address of 35 Congress Street, Salem, Mass., 01970. The strobe light is positioned proximate to the camera 50 and oriented so as to illuminate the field of view of the camera. Both the illumination device 51 and the camera 50 are electronically controlled by reading actuation means 54 in response to a signal from trigger means 46 such that the illumination device 51 and the camera 50 are both actuated at a point in time during the spinning of each object by the spinning means when code indicia containing area 30 is positioned in indexed relationship with the camera 50. Thus, the camera 50 is actuated to generate a single image during the spinning of each object. Due to the controlled timing of the actuation of the illumination device 51 and camera 50 by the reading actuation means and the relatively small field of view of the camera, the image which is produced by the camera is an image of the code indicia and only the code indicia, i.e. no other indicia such as 132 are present in the image.

Comparator Means

Figure 7:
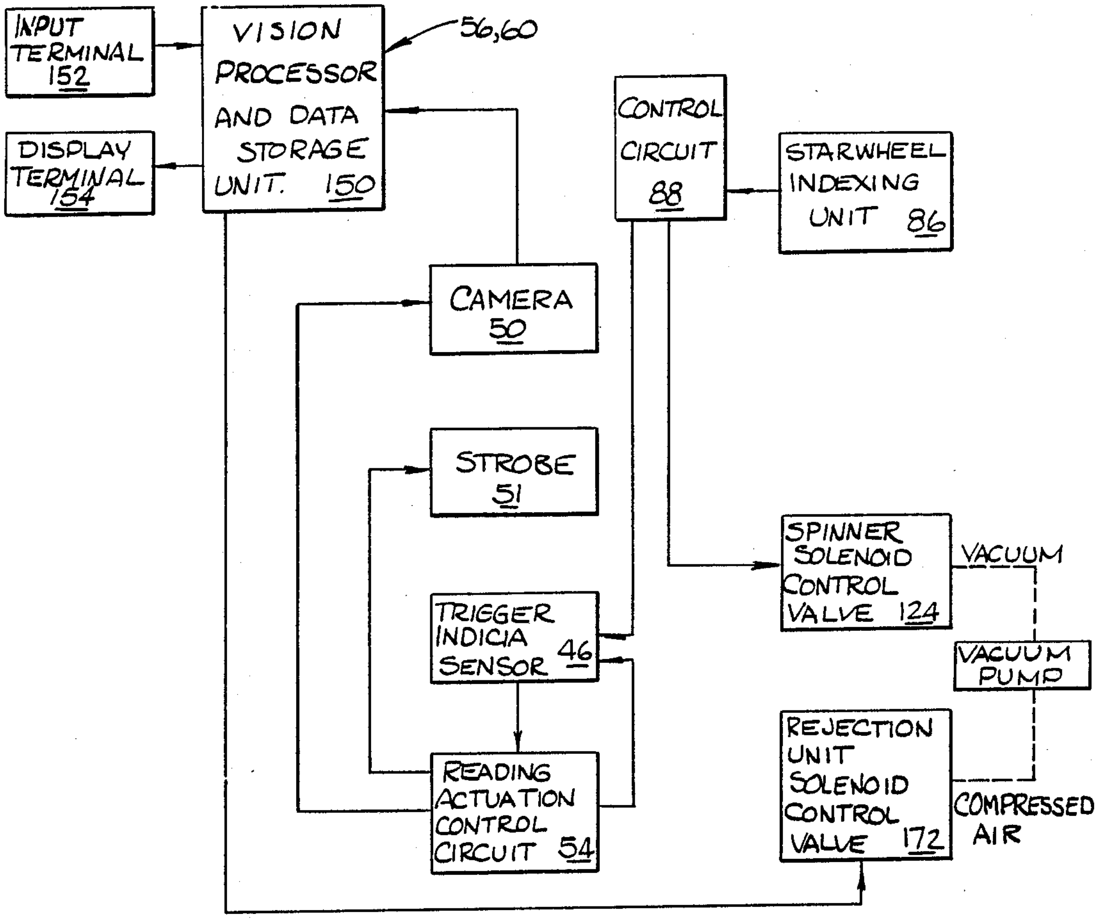
FIG. 7 is a block diagram illustrating the general functional relationship of various system components of one specific embodiment of a sorting apparatus.

The comparator means 56 for comparing the image produced by the camera 50 to predetermined comparison criteria may comprise a unitary central processing and data storage unit 150, FIG. 7, and an input device 152 such as a computer keyboard for enabling an operator to input the criteria to which an image generated by the camera 50 is to be compared. The comparator means 56 may also comprise a display terminal 154 such as a conventional CRT or decorator which displays information relating to the operation of the comparator means such as, for example, the criteria to which an image is to be compared, the number of conforming objects processed, the number of nonconforming objects processed, etc. The comparator means 56 may be a conventional computer-driven vision processing device such as, for example, that sold under product designation model MVP-2000 manufactured by Itran Corporation, having a business address of 670 North Commercial Street, Manchester, N.H., 03101.

Recording Means

The recording means 60 for recording the number of objects processed which match the predetermined comparison criteria may be any conventional data storage device such as data storage software provided as a component of a vision processing system such as Itran model MVP-2000 referenced above. The data recording means may also comprise a separate storage device such as a separate computer to which the data is downloaded or the printout of a conventional decorator, etc.

Object Segregating Means

The object segregating means 58 may comprise a conventional blow-off assembly including a blower nozzle 170 having a solenoid control valve 172 which is attached to a pressurized air source 174. The solenoid control valve 172 is actuated as through lead 173 by a signal from the comparator means 56 to open and provide air through the blower nozzle 170 which in turn provides an axially directed air jet against the second end 24 of an object, e.g. 17, which causes the object to be blown axially through opening 98 in starwheel end plate 92 into a reject chute 176 of conventional construction such as, for example, a pneumatic- or gravity-based chute which may feed into a collection hopper (not shown). In a preferred embodiment of the invention, hole 98 in plate 92 and hole 99 in plate 96 are positioned at the next indexing station along the transfer path after the spinning station.

Control System

Figure 6:
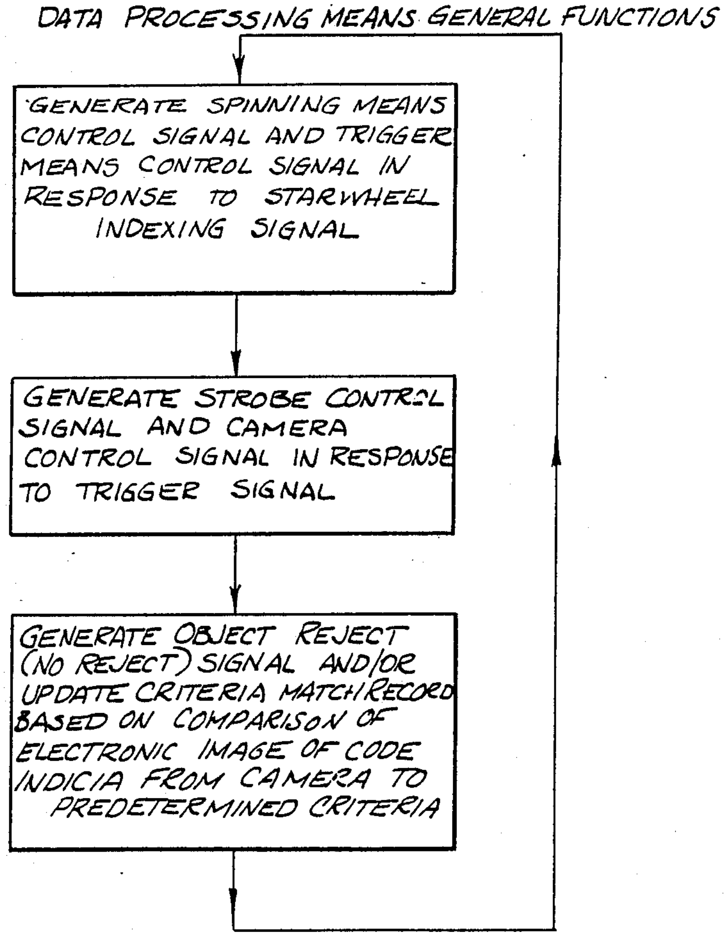
FIG. 6 is a flow chart of the general functions performed by the sorting apparatus data processing system.

The organization and operation of the control system of the present invention is illustrated generally in FIGS. 5 and 6. A data processing means 200 is provided which receives input signals from various components of the sorting apparatus 10 and which processes those signals and generates control signals in response thereto for actuating the various sorting apparatus components at the appropriate time. It will be appreciated by those having skill in the art that the data processing means may comprise a series of electrical or electronic circuits designed to perform the various required functions, or the data processing means may comprise one or more high-speed digital computer provided with the appropriate hardware and properly programmed software for performing the various functions, or the data processing means 200 may comprise a combination of one or more control circuits and one or more digital computers which are linked by appropriate interface circuitry for performing the various required functions. The operation of the control system in general will now be described with reference to FIGS. 5 and 6.

As illustrated in FIG. 5, the data processing means 200 input signals may comprise a signal from an input terminal, which may comprise a conventional computer keyboard and/or other input devices which enable an operator to provide information relating to programmable system parameters such as, for example, the specific comparison criteria which are to be used as the basis for sorting objects. It will, of course, be appreciated that a non-programmable data processing means 200 may be used which has preset values for all of the system parameters. Other data processing means inputs include the starwheel means indexing signal, the trigger indicia detection signal, and the camera image signal. The signals generated by the data processing unit and output to various system components may include a display signal to provide a display such as by a conventional CRT, printer, or the like, which may be indicative of various operator-selected inputs such as, e.g., code indicia comparison criteria, etc., and which may be further indicative of the sorting/differentiating function such as, for example, by indicating the number of objects processed by the system which conform to the comparison criteria (and the different categories thereof if applicable) and-/or the number of objects not conforming to the comparison criteria. The output signals may also include a spinner actuation signal, a trigger sensor actuation signal, a strobe actuation signal, a camera actuation signal, a segregating device actuation signal, and a recording device update signal. The relationship between the data processing means input signals and output signals are indicated generally by the flow chart in FIG. 6. As shown therein, the data processing means, in response to receiving the starwheel means indexing signal indicative of the registration of a starwheel pocket with the spinning means, generates a spinning means control signal which actuates the spinning means solenoid valve to cause engagement between the object in the indexed pocket and the spinning means and which, at the end of a predetermined period, deactuates the spinning means engagement means to terminate engagement of the object by the spinning means. The data processing means, in further response to the indexing signal, generates a trigger sensor control signal for actuating the trigger indicia sensor means to sense the passage of any trigger indicia passing through the trigger indicia sensor means scanning beam.

The data processing means next generates a strobe control signal in response to the trigger signal for actuating the asynchronous strobe unit at a time when the code indicia on an object being spun is positioned in opposite, camera-viewable relationship with the camera. The data processing means, in further response to the trigger signal, generates a camera control signal for actuating the camera for producing an electronic image of the portion of the object positioned opposite thereto during illumination thereof by the asynchronous strobe unit so as to generate an electronic image of the code indicia.

Next, the data processing means 200, in response to receiving an electronic image of the code indicia from the camera means, processes the code indicia image by comparing the image to predetermined criteria and may generate an object reject control signal based upon this comparison for actuating the object reject means for segregating objects conforming to the predetermined criteria from object which do not conform to the predetermined criteria. Alternately or in addition to actuating an object reject means based upon the comparison of each code indicia image to comparison criteria, the data processing means 200 may update a data recording means which preserves a record of the number of objects processed which have code indicia which match the predetermined criteria and/or which do not match the predetermined criteria.

Figure 8:
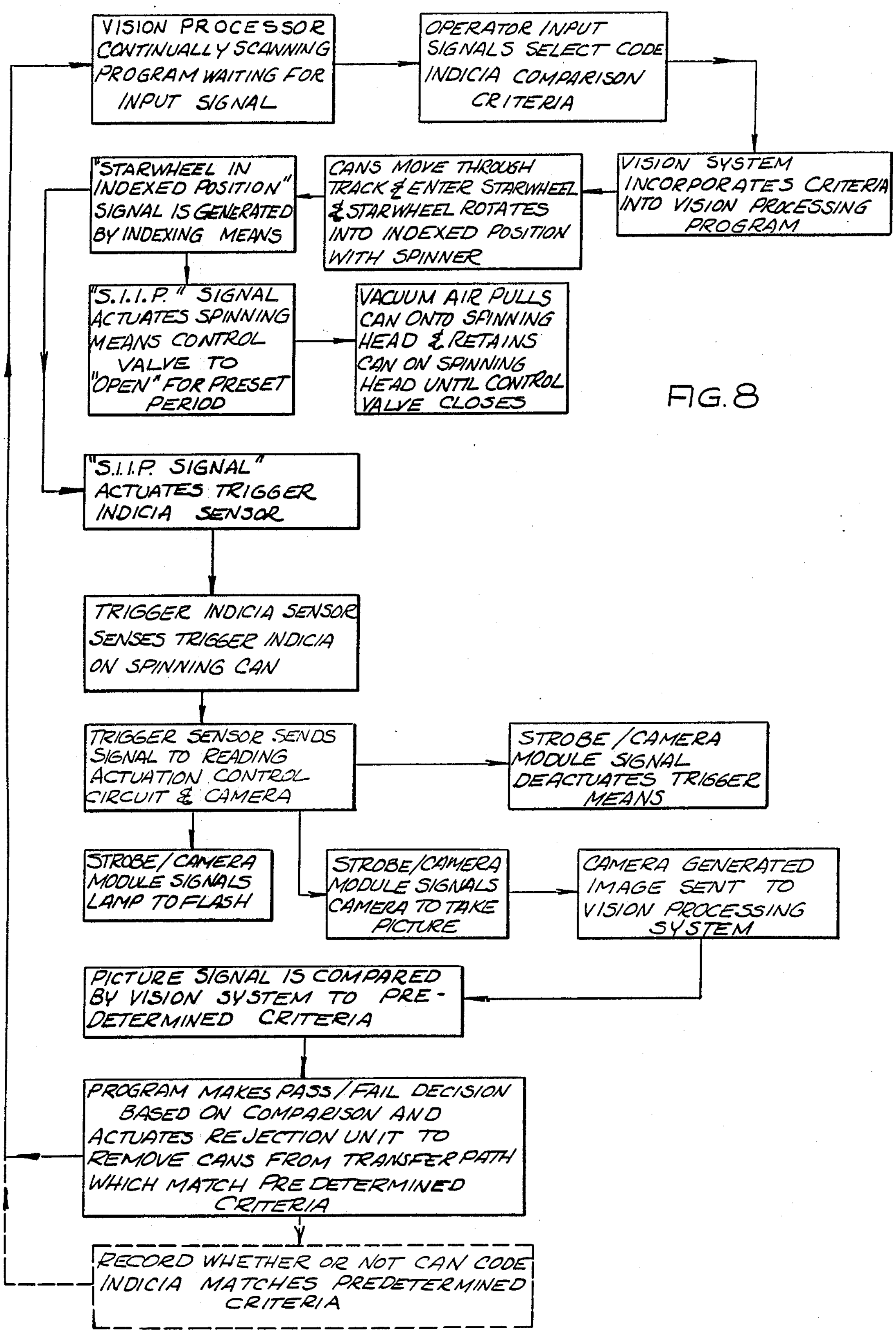
FIG. 8 is a flow chart illustrating the various sequence of operations performed in a sorting apparatus illustrated in FIGS. 1–4 and 7.

A block diagram illustrating a specific embodiment of the control system of the present invention, in association with the various system operating components, is illustrated in FIG. 7. The general sequence of operations of the specific embodiment of the control system shown in FIG. 7 is illustrated in the flow chart of FIG. 8. As indicated in FIG. 8, the vision processor 150 is continuously scanning the program waiting for input signals. As indicated in the next flow chart block, at any time during operation of the system, the operator may change the code indicia comparison criteria which the system is using through inputting new criteria by use of input terminal 152. Next, the vision system incorporates the new criteria into the vision processing logic. In the absence of new criteria, the vision processing system, of course, continues to use the previously input criteria. As indicated in the next block, cans move through the track onto the starwheel, and the starwheel moves a can in a pocket into indexed relationship with the spinning station. Next, the starwheel indexing unit 86 generates a signal indicative of the fact that the starwheel is in indexed relationship with the spinning means. This signal is sent to control circuitry 88 which generates control signals to two separate system components in response thereto. Control circuit 88, in response to receiving the starwheel in-indexed-position signal, sends a signal pulse to the spinning means solenoid control valve 124 which actuates the valve to open and to provide vacuum to the spinning head 120 causing a can body to be pulled onto the spinning head. At the same time, the circuit sends a signal pulse to the trigger means to actuate the trigger means. As discussed above, "actuation of the trigger means" may mean providing energy to a sensing unit which is de-energized between pocket indexing periods, or may mean enabling software in the reading actuation control circuit 54 to read the signal from a trigger sensing unit which is continuously in operation, depending upon the particular system design. The latter method of "actuating" the trigger means is the presently preferred method. The circuit 88 also provides a second signal pulse to deactuate solenoid control valve 124, terminating the vacuum to the spinning head 120 and causing disengagement of the can body from the spinning head. In another embodiment (not shown), the control valve 124 actuates a source of compressed air which is directed onto the can body to provide additional force to blowingly remove the can body from the spinning head. Control circuit 88 may comprise conventional timing circuitry or software for producing this second pulse which is sent to the control valve 124 at a predetermined period of time after the first signal pulse. Similarly, circuitry 88 may provide a second signal pulse to deactuate the trigger means at a predetermined period of time after the first signal pulse. (Alternatively, as shown in FIGS. 7 and 8, the trigger means may be deactuated in response to some later occurring event which may be the actuation of the camera 50 by the reading actuation control circuit 54.) Next, the trigger detection signal is sent to the reading actuation control circuit 54 which causes simultaneous, or nearly simultaneous, actuation of asynchronous strobe unit 51 and camera means 50, and which, in one embodiment of the invention, causes deactuation of the trigger means as described immediately above. Next, the image produced during the actuation of the camera means 50 is sent to vision processor and data storage unit 150 which compares the image generated by the camera to predetermined criteria. Next, the system determines whether a match of the criteria or no match has occurred and generates a rejection unit to remove cans from the transfer path which match the predetermined criteria, in one embodiment of the invention. As indicated in dashed lines, in addition to the previous step or in lieu of the previous step, the system may simply record the occurrence of an object matching the comparison criteria and/or record the occurrence of an object not matching the comparison criteria. The system thereafter repeats this basic cycle after the next pocket on the starwheel means moves into indexed relationship with the spinning means.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An apparatus for distinguishing between generally identically shaped objects having a first end, a second end, a central longitudinal axis and a longitudinally extending sidewall based upon code indicia provided on a predetermined, relatively small surface area portion on the sidewall of each object, comprising:

(a) transfer means for moving said objects in single file relationship along a transfer path extending substantially perpendicular to the longitudinal axes of the objects being moved therealong;

(b) spinning means for engaging an object in said transfer path and for spinning said engaged object about its longitudinal axis during a relatively short duration spinning period without removing said object from said transfer path;

(c) trigger means for sensing the passage of a trigger indicia, located at a predetermined circumferential position on the surface of said object relative to said code indicia, during the spinning of said object by said spinning means and for generating a trigger signal responsive thereto;

(d) code indicia reading means for reading said code indicia printed on said object and for generating an indicia reading signal indicative of indicia read thereby; and (e) reading actuation means responsive to said trigger signal for actuating said code indicia reading means for a short duration period during the spinning of said object at a time when said code indicia on said object is positioned in readable relationship with said reading means.

2. The invention of claim 1 further comprising:

comparator means for receiving the indicia reading signal from said indicia reading means and for comparing said signal to predetermined comparison criteria and for generating a criteria match signal indicative of a match between said indicia reading signal and said predetermined criteria.

3. The invention of claim 2 further comprising:

object segregating means responsive to said criteria match signal for segregating objects having code indicia conforming to said predetermined criteria from objects having code indicia not conforming to said predetermined criteria.

4. The invention of claim 3 wherein said object segregating means comprises an axial displacement device for axial discharging an object from a pocket means in response to said criteria match signal.

5. The invention of claim 4, said axial displacement means comprising a valve actuated air jet.

6. The invention of claim 2 further comprising:

recording means responsive to said criteria match signal for recording the number of objects passing through said transfer means which match said predetermined criteria.

7. The invention of claim 2 wherein said transfer means comprises:

(a) starwheel means for receiving and transferring said objects along an arcuate transfer path, comprising:

(i) a central axis of rotation extending parallel to said central longitudinal axes of said objects received in said starwheel means; and (ii) pocket means arranged symmetrically about the periphery of said starwheel means for receiving and holding said objects therein;

(b) starwheel drive means for rotating said starwheel means about said central axis of rotation;

(c) starwheel indexing means for controlling the rotation of said starwheel means for temporarily placing each pocket means thereon in axially opposite, indexed relationship with said spinning means for enabling axial engagement and spinning of an object in an indexed pocket means by said spinning means.

8. The invention of claim 7 wherein said trigger means comprises a stationary sensor positioned along said arcuate transfer path proximate said spinning means.

9. The invention of claim 8 wherein said trigger means comprises an optical sensor.

10. The invention of claim 9 wherein said trigger means optical sensor comprises a laser.

11. The invention of claim 7 wherein said code indicia reading means comprises:

(a) asynchronous strobe means for briefly illuminating an area of an object containing said code indicia thereon; and (b) camera means for producing an image of said code indicia during illumination thereof by said strobe means; and (c) image processing means for processing said code indicia image produced by said camera means for recognizing data provided in said image.

12. The invention of claim 11, said strobe means and said camera means each being positioned at a fixed location along said object transfer path proximate said spinning means.

13. The invention of claim 2 wherein said comparator means comprises a microprocessor.

14. The invention of claim 2 wherein said predetermined comparison criteria comprises a plurality of different sets of criteria.

15. The invention of claim 14 wherein said comparator means generates a distinguishable match signal for a match of each different set of criteria.

16. The invention of claim 15 further comprising recording means for recording the number or criteria matches associated with each of said different sets of criteria.

17. The invention of claim 16 wherein each different set of criteria is associated with a different beverage product source.

18. The invention of claim 1 wherein said reading actuation means comprises a microprocessor.

19. The invention of claim 1 wherein said spinning means comprises:

suction cup means positioned at a fixed location along said transfer path for engaging, holding, and disengaging an object at an end surface portion of the object, said suction cup means having a central longitudinal axis positioned in substantially coaxial relationship with the central longitudinal axis of each said object positioned in a pocket means when said pocket means is positioned in an indexed relationship with said spinning means;

rotating means for rotating said suction cup means about said suction cup central longitudinal axis.

20. A method of distinguishing between generally identically shaped objects based upon code indicia provided on a predetermined, relatively small surface area portion of the sidewall of each object comprising:

(a) moving the objects to be sorted in a single file relationship along a continuous object transfer path extending transversely of the longitudinal axes of the objects;

(b) temporarily halting the movement of each object moving along the transfer path at a predetermined spinning station along the path;

(c) spinning each object which is stopped at the spinning station about its longitudinal axis without removing the object from the transfer path (d) during the spinning of each object, monitoring a narrow circumferential band at a predetermined axial location on the surface of the object with a stationary sensor for detecting the passage of an axially extending trigger indicia provided on the surface of the object in predetermined circumferential relationship with the code indicia provided on the object and generating a trigger signal indicative thereof; and (e) in response to said trigger signal, actuating a stationary, imaging apparatus at a time, during spinning of the object, when the code indicia on the object is located in the field of view of the imaging apparatus so as to generate an image of the code indicia.

21. The method of claim 20 comprising the further step of:

comparing the image of the code indicia generated by the imaging apparatus to predetermined criteria.

22. The invention of claim 21 comprising the further step of:

physically segregating the objects having code indicia conforming to said predetermined criteria from objects having code indicia not conforming to said predetermined criteria.

23. The invention of claim 21 comprising the further step of recording the passage of each object having code indicia matching said predetermined criteria.

24. An apparatus for sorting generally identically shaped elongate objects of the type having a first end, a second end, a central longitudinal axis extending between said first end and said second end, and a circumferentially and longitudinally extending sidewall, the sorting being based upon information contained in coded indicia provided in the same, relatively small area region on the sidewall surface of each object, said small area region lying within a circumferential band containing other, circumferentially obstructing indicia, each object also comprising a trigger indicia positioned in a predetermined, circumferentially fixed relationship with the code indicia, said trigger indicia being provided in a 360° circumferential band which is free of indicia other than said trigger indicia, said sorting apparatus comprising:

(a) starwheel means for moving said objects along an arcuate transfer path, said starwheel means having a first axial end, a second axial end, and a central axis of rotation; and having a plurality of equally circumferentially spaced object receiving and holding pockets positioned at the periphery thereof, each of said pockets being adapted to hold one of said objects therein with said central longitudinal axis of said object positioned parallel to said central longitudinal axis of said starwheel and with said first end of said object positioned proximate said first axial end of said starwheel means and with said second end of said object positioned proximate said second axial end of said starwheel means;

(b) guiding means operatively associated with said starwheel means for retaining said objects received in said pockets in radially, axially and circumferentially stationary relationship with respect to said starwheel means while said objects are transversing said arcuate transfer path;

(c) a starwheel indexing drive means for rotating said starwheel means about said central axis of rotation in a series of equal incremental movements, the number of said equal incremental movements required to provide a complete revolution of said starwheel means being equal to an integer number multiple of the number of pockets provided on said starwheel means whereby each pocket is positioned in the same relatively rotated position as the immediately preceding pocket after a predetermined number of incremental movements;

(d) starwheel position indicating means for sensing predetermined, relatively rotated positions of said starwheel means corresponding to the axial alignment of each pocket on said starwheel with a predetermined spinning station positioned at a fixed location along said arcuate transfer path and for providing an indexing signal in response thereto;

(e) spinning means located at said spinning station and engageable and disengageable from an object in a pocket positioned in indexing relationship with said spinning station for spinning said object about its central longitudinal axis without removing the object from said pocket;

(f) trigger indicia sensor means positioned at said spinning station at a fixed location radially adjacent to said transfer path, said trigger indicia sensor means having a scanning beam adapted to be directed upon the surface of an object being spun by said spinning means in the region of said circumferential band containing said trigger indicia for sensing the passage of said trigger indicia and generating a trigger signal in response thereto;

(g) asynchronous strobe means positioned proximate said camera means for illuminating said object during spinning thereof at a time when the code indicia thereon is positioned in camera viewable relationship with a camera means;

(h) camera means positioned at said spinning station at a location radially adjacent to an object in a pocket which is indexed to said spinning station and at an axial location corresponding to the axial location of said code indicia on the object for generating an electronic image of the code indicia;

(i) object rejection means for removing an object from the normal flow of objects along said arcuate transfer path; and (j) data processing means for receiving said indexing signal and for generating a spinning means control signal in response thereto for actuating said spinning means to engage, spin, and disengage an object positioned in an oppositely aligned pocket in response thereto; and for generating a trigger sensor control signal in response to said indexing signal for actuating said trigger indicia sensor means to sense the passage of trigger indicia passing through said trigger indicia sensor means scanning beam; and for receiving said trigger signal and for generating a strobe control signal in response thereto for actuating said asynchronous strobe means at a time when said code indicia on an object being spun is positioned in camera-viewable relationship with said camera means; and for generating a camera control signal in response to said trigger signal for actuating said camera for producing said electronic image of said code indicia during illumination thereof by said asynchronous strobe means; and for processing said code indicia image for comparing said image to predetermined criteria and for generating an object reject control signal based upon said comparison for actuating said object reject means for removing objects conforming to said predetermined criteria.

25. The invention of claim 24 wherein said objects comprise a circular cross section.

26. The invention of claim 25 wherein said objects comprise a generally cylindrical configuration.

27. The invention of claim 26 wherein said objects are can bodies.

28. The invention of claim 24 wherein said code indicia is indicative of a particular decorator which decorated graphics on the object.

29. The invention of claim 24 wherein said code indicia is indicative of the date upon which a particular mass production operation was performed on the object.

30. The invention of claim 24 wherein said code indicia is indicative of the operating shift at which a particular mass production operation was performed on the object.

31. The invention of claim 24 wherein said code indicia is indicative of the source of said object.

32. The invention of claim 24 wherein said data processing means comprises a digital computer.

* * * * *